United States Patent
Schultink et al.

(10) Patent No.: US 7,094,270 B2
(45) Date of Patent: Aug. 22, 2006

(54) COMPOSITE FILTER AND METHOD OF MAKING THE SAME

(75) Inventors: Jan Schultink, Overpelt (BE); Bas Schultink, Overpelt (BE)

(73) Assignee: Airflo Europe N.V., Overpelt (BE)

( * ) Notice: Subject to any disclaimer, the term of this patent is extended or adjusted under 35 U.S.C. 154(b) by 13 days.

(21) Appl. No.: 10/469,415

(22) PCT Filed: Mar. 1, 2002

(86) PCT No.: PCT/EP02/02251

§ 371 (c)(1),
(2), (4) Date: Dec. 22, 2003

(87) PCT Pub. No.: WO02/070107

PCT Pub. Date: Sep. 12, 2002

(65) Prior Publication Data

US 2004/0083695 A1    May 6, 2004

(30) Foreign Application Priority Data

Mar. 2, 2001  (EP)  ................................. 01105152

(51) Int. Cl.
*B03C 3/011* (2006.01)

(52) U.S. Cl. .......................... 55/486; 55/485; 55/487; 55/DIG. 2; 55/382; 55/528; 15/347; 15/352; 95/57; 95/287; 96/66; 96/69; 428/340; 428/903; 442/389

(58) Field of Classification Search .................... 95/57, 95/78, 287; 15/347, 352; 55/485–487, DIG. 2, 55/382, 528; 96/15, 69, 66; 428/340, 903; 442/389

See application file for complete search history.

(56) References Cited

U.S. PATENT DOCUMENTS

| 2,732,911 | A | | 1/1956 | Gall |
| 2,804,166 | A | | 8/1957 | Stevens et al. |
| 2,813,596 | A | | 11/1957 | Voigtman et al. |
| 3,073,735 | A | * | 1/1963 | Till et al. ................... 264/113 |
| 3,370,406 | A | | 2/1968 | Fesco |

(Continued)

FOREIGN PATENT DOCUMENTS

DE    195 44 790 A1    5/1997

(Continued)

OTHER PUBLICATIONS

American Allergy Supply-3M Filtrete Vacuum Filter Bags Internet Web Publication http://www.neosoft.com/users/s/sreifler/3mbagidx.htm, Copyright 1994-1997.

(Continued)

*Primary Examiner*—Minh-Chau T. Pham
(74) *Attorney, Agent, or Firm*—Brinks Hofer Gilson & Lione

(57) ABSTRACT

The invention refers to a composite filter for filtering a stream of ambient air including at least one non-prebonded upstream tier and one non-prebonded downstream tier, wherein the ratio of absolute pore volume of upstream tier to downstream tier RAPV>2, and the absolute projected fiber coverage of upstream tier and of downstream tier APFC>95%. Further, the invention refers to a method of making such a composite filter including the steps of (a) laying down a filtration material onto a support to form the upstream non-prebonded tier, (b) depositing onto the upstream tier the downstream non-prebonded tier, and (c) bonding the tiers to form a composite filter having a unitary stratified structure.

20 Claims, 16 Drawing Sheets

U.S. PATENT DOCUMENTS

| | | |
|---|---|---|
| 3,774,375 A | 11/1973 | Smith |
| 3,971,373 A | 7/1976 | Braun |
| 4,011,067 A | 3/1977 | Carey, Jr. |
| 4,032,688 A * | 6/1977 | Pall .......................... 428/36.1 |
| 4,116,648 A | 9/1978 | Busch |
| 4,164,400 A | 8/1979 | Wald |
| 4,178,157 A | 12/1979 | van Turnhout et al. |
| 4,215,682 A | 8/1980 | Kubik et al. |
| 4,257,791 A | 3/1981 | Wald |
| 4,375,718 A * | 3/1983 | Wadsworth et al. .......... 29/886 |
| 4,429,001 A | 1/1984 | Kolpin et al. |
| 4,589,894 A | 5/1986 | Gin et al. |
| 4,592,815 A | 6/1986 | Nakao |
| 4,714,647 A | 12/1987 | Shipp, Jr. et al. |
| 4,917,942 A | 4/1990 | Winters |
| 4,925,601 A | 5/1990 | Vogt et al. |
| 4,948,639 A | 8/1990 | Brooker et al. |
| 5,230,800 A | 7/1993 | Nelson |
| 5,244,703 A | 9/1993 | Bosses |
| 5,248,323 A | 9/1993 | Stevenson |
| 5,306,534 A | 4/1994 | Bosses |
| 5,401,446 A | 3/1995 | Tsai et al. |
| 5,419,953 A | 5/1995 | Chapman |
| 5,437,910 A | 8/1995 | Raabe et al. |
| 5,470,485 A | 11/1995 | Morweiser et al. |
| 5,607,735 A | 3/1997 | Brown |
| 5,620,785 A | 4/1997 | Watt et al. |
| 5,647,881 A | 7/1997 | Zhang et al. |
| 5,667,562 A | 9/1997 | Midkiff |
| 5,690,711 A | 11/1997 | Bosses |
| 5,730,923 A | 3/1998 | Hassenboehler, Jr. et al. |
| 5,855,784 A * | 1/1999 | Pike et al. .................. 210/505 |
| 5,979,030 A | 11/1999 | Legare |
| 5,993,501 A | 11/1999 | Cusick et al. |
| 6,045,595 A | 4/2000 | Freudenberg |
| 6,171,369 B1 * | 1/2001 | Schultink et al. ............... 95/57 |
| 6,183,536 B1 * | 2/2001 | Schultink et al. ............... 95/57 |
| 6,514,325 B1 * | 2/2003 | Cox et al. ...................... 96/69 |
| 6,706,086 B1 * | 3/2004 | Emig et al. ................... 55/486 |

FOREIGN PATENT DOCUMENTS

| | | |
|---|---|---|
| DE | 196 06 718 A1 | 8/1997 |
| EP | 0 338 479 A1 | 10/1989 |
| EP | 0 161 790 B1 | 2/1990 |
| EP | 0 375 234 A1 | 6/1990 |
| EP | 0 477 007 A1 | 3/1992 |
| EP | 0 246 811 B1 | 11/1992 |
| EP | 0 582 286 A1 | 2/1994 |
| EP | 0 639 061 A1 | 5/1997 |
| WO | WO 97/30772 | 8/1997 |
| WO | WO 98/11282 | 3/1998 |
| WO | WO 01/03802 | 1/2001 |

OTHER PUBLICATIONS

Jirsak, O. et al; Nonwoven Textiles; Carolina Academic Press; Durham, North Carolina; 1999; pp. 26-29.

Ward, G.; "Micro Denier Nonwoven Process and Fabrics;" Nonwovens World; Summer 1998; pp. 37-40.

* cited by examiner

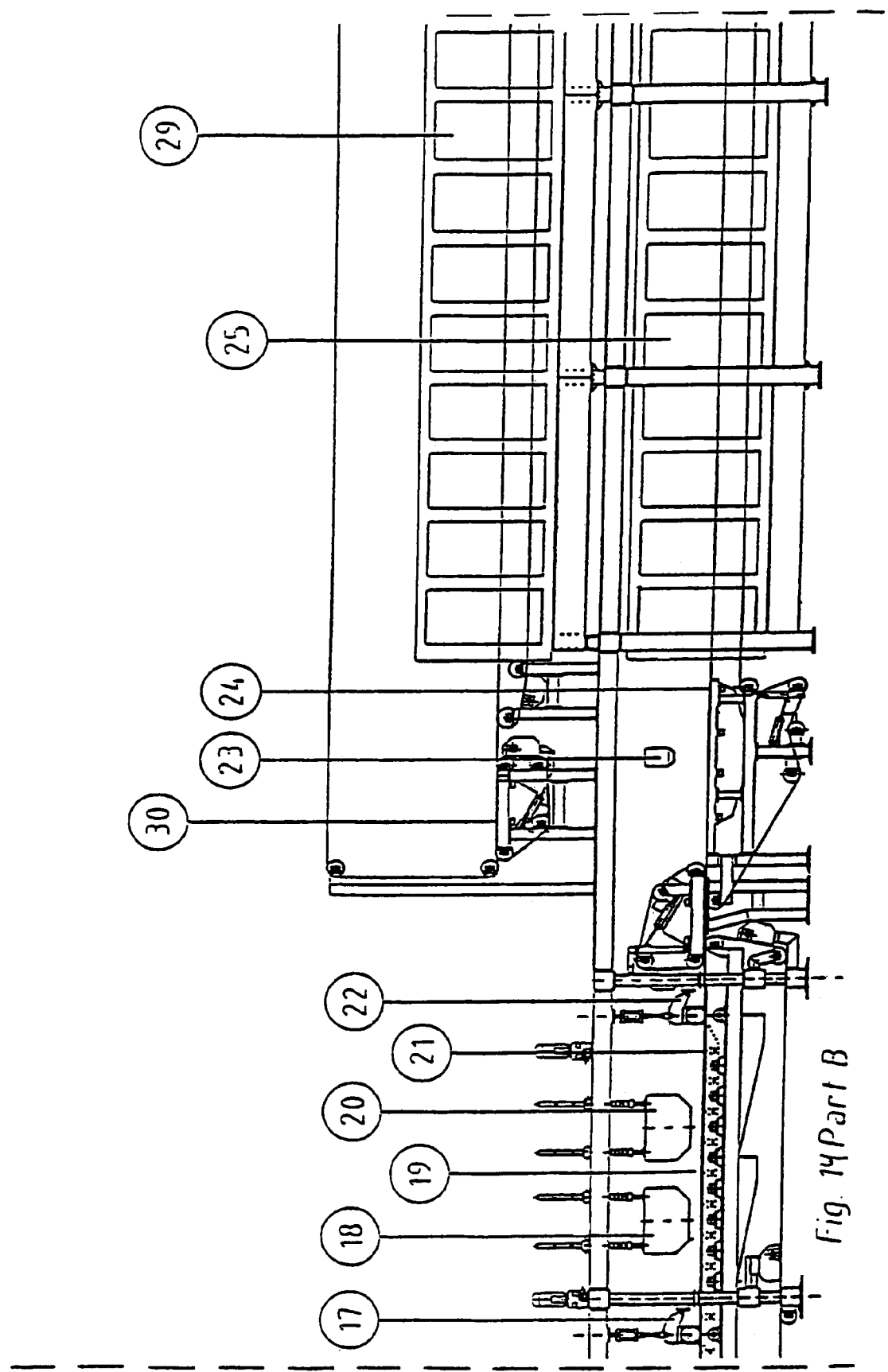
Fig. 14 Part B

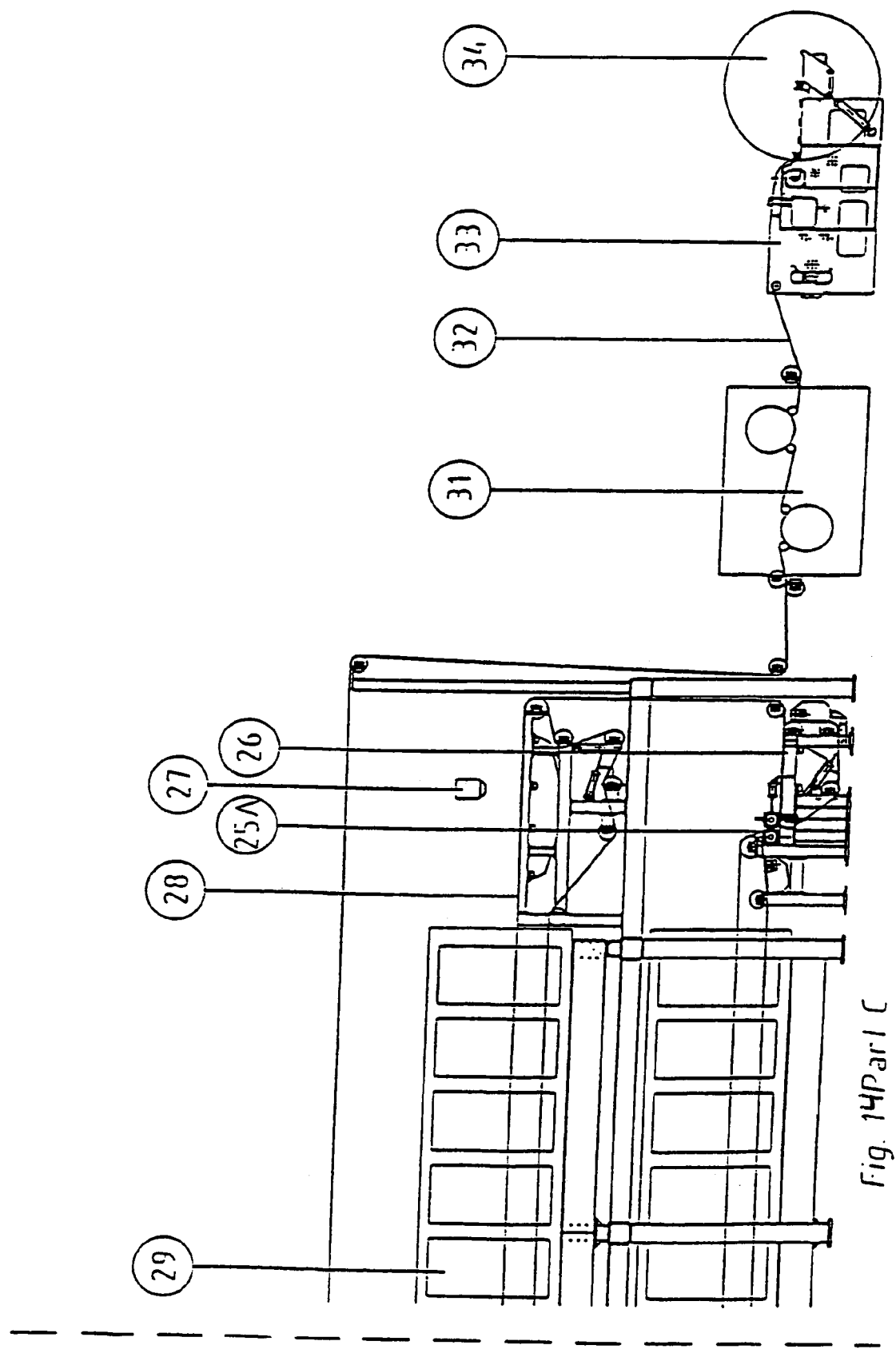
Fig. 14 Part C

COMPOSITE FILTER AND METHOD OF MAKING THE SAME

This application is based on, and claims priority to International Application No. PCT/EP02/02251, filed Mar. 1, 2002 and European Application No. 011 05 152.1, filed Mar. 2, 2001.

FIELD OF THE INVENTION

The invention relates, to a composite filter for removing solid particles entrained in a stream of ambient air. More specifically, it relates to a composite filter comprising at least one non-prebonded upstream tier and one non-prebonded downstream tier useful for filtering particulates from ambient air.

The term "pre-bonded" means herein that a composition of filter medium, such as thermally bondable fusing fibers or adhesively bindable fibers, is treated in a manner effective to activate the binding mechanism thereby forming a separate, free-standing, cohesive, and typically self-supporting web of that filter composition. Such a pre-bonded web can be mechanically manipulated by such processes as winding on a roll, unwinding from a roll, cutting and the like.

The term "tier" herein means a band formed from non-prebonded filter material into a stratum of unitary stratified structure. In contrast, a "layer" means a separately, prebonded, self-supporting web of filter material.

BACKGROUND AND PRIOR ART

In recent times, the technology for filtering particulates from gases has become quite sophisticated in both commonplace applications such as consumer oriented vacuum cleaning of dirt and dust as well as very demanding industrial applications such as removal from gases of specific particle size fractions of wide varieties of contaminants including from inert to biochemically sensitive, among others. It is now well appreciated that the contaminating particulates in a gas stream can have a wide variety of sizes, geometric shapes, e.g., elongated and spherical, and chemical and physical compositions, e.g., odor-free and odoremitting particles.

Consequently, filtration technology has evolved to provide filter media which are adapted to optimally filter specific fractions of the contaminating particulates. Also, this technology has developed techniques for optimizing various performance characteristics of filters such as maintaining low pressure drop across the filter and increasing the filter service life so as to extend the length of time between filter element replacements.

The traditional approach to achieving these objectives has been to provide a multilayer filter medium composed of separate, individually designed layers which are each intended to accomplish primarily one, and sometimes several specific filter functions. For example, a very open, porous and thin scrim is often used to protect underlying filter layers from abrasion by fast moving, large and hard particles; a porous and bulky layer is typically used to capture substantial amounts of chiefly large particles, and an ultrafine diameter filament, low porosity layer is usually prescribed for removing the smallest particles to increase filtration efficiency. From the many choices available, separate filter layers are selected and combined in a preselected sequence then assembled as a group to form a multilayer, and therefore multifunctional filter. The one or more adjacent layers can be bonded to each other or the layers can be unbonded. Optionally, the individual layers can be sandwiched between covers, typically of paper, for structural integrity and ease of handling.

A drawback of the aforementioned multilayer system of constructing multifunctional filters is that there is repetitive processing of the filter media which can be excessive. That is, the filter material in a given layer is first processed to form the individual layer, then it is processed to assemble that layer in the multilayer filter. Each step adds to the compaction and cover, if ever slight, of the final filter product. This tends to raise the pressure drop through the filter and reduce dust holding capacity, thereby limiting service life.

WO 01/03802 discloses a composite filter comprising at least one non-prebonded upstream tier and one non-prebonded downstream tier. However, as will be shown in detail below (FIG. 2), in this composite filter a relatively high pressure drop across the composite filter occurs. Further, also the service life time of this filter is low.

In view of this, the objective problem underlying the invention is to provide a composite filter in which the pressure drop across the filter is maintained low and which has a long service life time.

SUMMARY OF THE INVENTION

This objective problem is solved by a composite filter for filtering a stream of ambient air comprising at least one non-prebonded, upstream tier and one non-prebonded downstream tier, wherein the ratio of absolute pore volume of upstream tier to downstream tier RAPV>2, and the absolute projected fiber coverage of upstream tier and of downstream tier APFC>95%.

Due to the parameters of this composite filter, the pressure drop across the filter medium is kept low and the service life time of the filter is increased.

Further, this invention enables to provide a composite filter made up of at least two stacked tiers of filtration material bonded together to form a unitary stratified structure. The composition of filtration material in any given tier is preselected to perform a desired filtering function. For example, fine, (i.e., small diameter) and densely packed fibers can be selected to capture very small dust particles such as those of about 5 micrometers and smaller. Additionally, electrostatically charged fibers can also be used to stop passage of these and even smaller particles. Similarly, bulky, highly porous media designed to have large dust holding capacity can be utilized to trap medium to large size dirt particles.

Since the composite filter of the invention comprises non-pre-bonded tiers, the bonding of at least one and preferably all of the tiers to form the unitary structure is begun only after the stacking of all the tiers of a particular desired composite filter structure has been completed. The resulting structure is a single body composed of different types of filtration material which appear as distinct strata.

In view of this, the stratified structure is formed by building up a stack of tiers of selected filtration materials. Because the tiers are non-prebonded, the components of each tier, that is, fibers, granules, etc., generally are laid loosely by mechanical or air-laying processes onto the layer lying below. Within each tier the composition of filter material is largely uniform and there is a "fuzzy" interface between the tiers.

Preferably, the composite filter of the above mentioned kind comprises a ratio of average pore diameter of upstream to downstream tier RPD in the range of 4<RPD<10.

Due to this ratio, the dust holding capacity of the upstream tier is greatly increased, such that the upstream tier acts as a pre filter for the downstream tier without increasing the pressure drop across the composite filter.

Additionally but not exclusively, such composite filter may comprise an average pore diameter of the upstream tier PDU, with PDU>60 µm, preferably in the range 80 µm<PDU<200 µm.

All above discussed composite filters may comprise upstream tiers with a relative pore volume RPVU>94%, preferably RPVU>96%, an apparent density ADU<0.05 g/cm$^3$, and a thickness D in the range of 0.5 mm<D<2.5 mm. Choosing these parameters results in an upstream tier with the required RAPV and APFC.

Further, this composite filters may also comprise downstream tiers with a relative pore volume RPVD being smaller than RPVU, an apparent density ADD in the range of 0.07 g/cm$^3$<ADD<0.14 g/cm$^3$, and a thickness D in the range of 0.1 mm<D<0.4 mm. Choosing these parameters results in an downstream tier with the required RAPV and APFC.

Further, the upstream tier of any of the above discussed composite filter may preferably comprise fibers having a length in the range of 0.1 mm to 3.0 mm.

Due to such a structure, the upstream tier can be made bulkier to provide greater dust holding capacity.

Preferably, the above discussed composite filters may comprise an upstream tier having a dust retention DR with respect to dust particles with a diameter corresponding to the average pore diameter of the downstream tier of DR>99%.

This feature avoids an clogging of the downstream tier, and therefore, further maintains a low pressure drop across the filter and further increases the service life time of the composite filter.

Additionally but not exclusively, this effect can be increased in a composite filter in which the orientation of the fibers in flow direction in the upstream tier is higher than in the downstream tier. Such structure further improves maintaining the pressure drop across the filter.

The composite filters, as discussed above, may comprise an upstream tier of dry-laid, thermally bondable fusing, bicomponent or monocomponent polymer fibers and a downstream tier of meltblown fibers. In this aspect a single tier is constituted of a single type of filter medium, for example, 100% bicomponent polymer fibers, melt blown, staple fibers, or spunbond filaments.

Alternatively, the composite filter may comprise an upstream tier having a composition selected from the group consisting of 100 wt % bicomponent polymer fibers, a blend of at least about 10 wt % bicomponent polymer fibers with a complementary amount of natural fibers, such as fluff pulp fibers or kokon fibers, staple fibers or a mixture thereof, and a blend of at least about 10 wt % monocomponent polymer thermally bondable fusing fibers with a complementary amount of fluff pulp fibers, staple fibers or a mixture thereof.

In this aspect, a single tier is constituted by a blend of media, such as an air-laid, usually uniform blend of bicomponent polymer fibers and fluff pulp (FP) fibers.

Since it is also desirable to provide a stratified structure, adjacent tiers in a stack may have different compositions. Nonetheless, a composition of one tier can be repeated in a stack although at least one tier of different composition should be present between the tiers of same composition.

This structure of the composite filter differs from that of conventional multilayer filtration media which are formed by laminating a plurality of individual filter medium layers that have each been pre-bonded to form a self-supporting web prior to formation of the multilayer laminate.

Such unitary stratified structure provides a number of significant advantages over conventional filter media. In one aspect, the unitary stratified structure can be made bulkier to provide greater dust holding capacity than a laminate of individually, pre-bonded layers having compositions corresponding respectively to the tiers of the unitary structure. This is because each portion of the conventional filter medium is compressed at least twice: once when the individual layer is formed by bonding, and a second time when the individual layers are laminated to form the filter.

Preferably, the bicomponent polymer fibers of this structure may have a sheath of one polymer and a core of a different polymer having a melting point higher than the one polymer. The core may comprise polypropylene and the sheath may comprise polyethylene.

Additionally, the core may be disposed eccentric relative to the sheath. In such a structure, the fibers will crimp with the result that the bulkiness of the tier is further increased.

Preferably and alternatively, the above discussed composite filter may comprise an upstream tier further having fibers selected from at least one of uncharged split film fibers, charged split film fibers and mixed electrostatic fibers.

Accordingly, the present invention now provides a composite filter comprising at least two nonprebonded tiers each tier independently comprising at least one filtration material and being distinct from the adjacent tier, in which the tiers are bonded together to form a unitary stratified structure having a first boundary surface adapted to receive particulates entrained in air and a second boundary surface adapted to discharge filtered air, this composite filter showing a reduced pressure drop and a prolonged service life time.

All above discussed composite filters may be embodied in a vacuum cleaner bags, and more generally in vacuum filters. By "vacuum filter" is meant a filter structure intended to operate by passing a gas, preferably air, which entrains usually dry solid particles, through the structure. The convention has been adopted in this application to refer to the sides, tiers and layers of the structure in relation to the direction of air flow. That is, the filter inlet side is "upstream" and the filter discharge side is "downstream" for example. Occasionally herein the terms "in front of" and "behind" have been used to denote relative positions of structure elements as being upstream and downstream respectively. Of course, there will be a pressure gradient, sometimes referred to as "pressure drop", across the filter during filtration. Vacuum cleaners typically use bag shaped filters. Normally, the upstream side of a vacuum bag filter is the inside and the downstream side is outside.

In addition to vacuum cleaner bags, the composite filter of the invention can be utilized in applications such as heating ventilation and air conditioning (HVAC systems, vehicle cabin air filters, high efficiency (so-called "HEPA") and clean room filters, emission control bag house filters, respirators, surgical face masks and the like. Optionally, the composite filter can be used in such applications with an additional carbon fiber or particle-containing layer in series with the composite filter of the invention, for example to absorb odors or toxic contaminants. Moreover, certain applications, such as HEPA and clean room filters can employ additional layers in series with the composite filter of the invention, such as low porosity polytetrafluorethylene (PTFE) membrane laminated to a boundary surface of an appropriate unitary stratified structure, composite filter.

The present invention also provides a method of making a composite filter of the above kind, comprising the steps of (a) laying down a filtration material onto a support to form the upstream non-prebonded tier,
(b) depositing onto the upstream tier the downstream non-prebonded tier, and
(c) bonding the tiers to form a composite filter having a unitary stratified structure.

DESCRIPTION OF PREFERRED EMBODIMENTS

Figure 1:
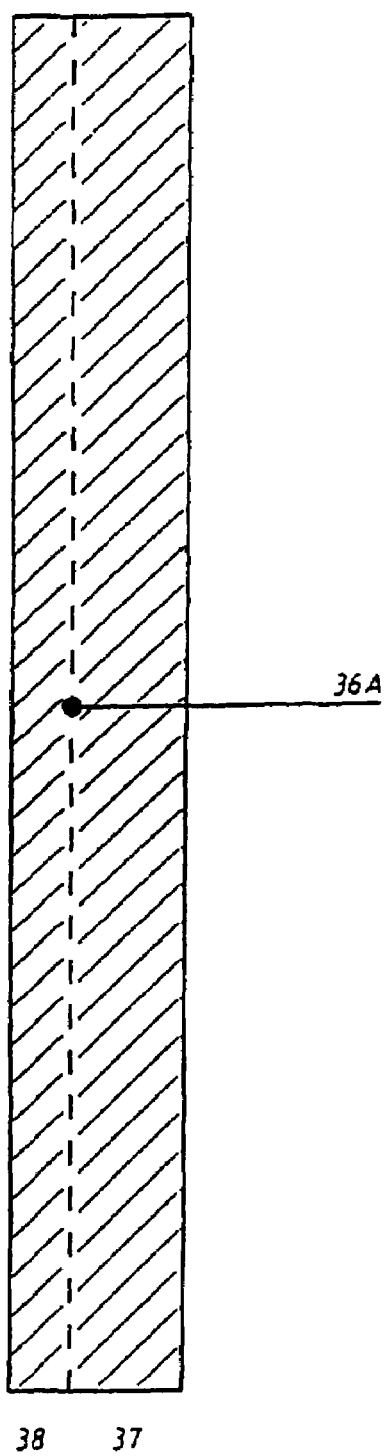
FIG. 1 is a schematic diagram showing in cross section an embodiment of the composite filter in accordance with the invention having a unitary stratified structure of two tiers.

In the following, and before discussing explicitly discussing the preferred embodiments of the invention, different filter material compositions which suitably used in the present invention are described in greater detail:

Regarding the discussion below, DIN 44956-2 test has been employed to determine the increase in pressure drop of five different examples of vacuum cleaner bag constructions after dust loading with fine dust at the following levels: 0, 0.5, 1.0, 1.5, 2.0, and 2.5 grams.

Air Permeability after Fine Dust Loading Test: The dust loading part of the DIN 44956-2 is performed at 0.5 gram increments from 0 to 2.5 g/($m^2$×s) on seven bags of each sample. However, the pressure drop values are not recorded again. The maximum sustainable air permeability values are then determined on the bags, which had the specified levels of dust loading.

Standard Vacuum Cleaner Filter Bag Material:

This material, sometimes referred to as "standard paper" has traditionally been used as a single ply in which it provides dust filtration and containment, as well as the strength and abrasion resistance required of a vacuum cleaner bag. This material is also rigid enough to enable easy fabrication on standard bag manufacturing equipment. The paper is predominantly composed of unbleached wood pulp with 6–7% of a synthetic fiber such as poly[ethylene terephthalate] (PET) type polyester, and is produced by the wet laying process. The standard paper typically has a basis weight of about 30–80 g/$m^2$ and commonly about 50 g/$m^2$. The PET fibers typically have a fineness of 1.7 dtex and lengths of 6–10 mm. This paper has air permeability in the range of about 200–500 L/($m^2$×s) and an average pore size of about 30 mm. However, the efficiency as determined from the DIN 44956-2 Test is only about 86%. Another characteristic is that the pores are quickly clogged with dust and the dust holding capacity is further limited-by the very thin paper thickness of only about 0.20 mm.

Spunbond Nonwoven:

A nonwoven of spunbond polymer fibers can be deployed as a filtration tier in the structure. The fibers can be of any spunbond-capable polymer such as polyamides, polyesters or polyolefins. Basis weight of the spunbond nonwoven should be about 10–100 g/$m^2$ and preferably about 30–40 g/$m^2$. The spunbond nonwoven should have an air permeability of about 500–10,000 L/($m^2$×s), and preferably about 2,000–6,000 L/($m^2$×s) as measured by DIN 53887. The spunbond can also be electrostatically charged.

Scrim or Supporting Fleece:

Scrim refers to a generally light basis weight, very open porous paper or nonwoven web. Basis weight of the scrim is typically about 10–30 g/$m^2$, and frequently about 13–17 g/$m^2$. The scrim, sometimes referred to as a supporting fleece usually has air permeability of about 500–10,000 L/($m^2$×s). It is primarily employed to protect other tiers or layers from abrasion. The scrim can also filter the very largest particles. The scrim, as well as any tier of the filter composite, can be electrostatically charged provided the material has suitable dielectric properties.

Wet-Laid High Dust Capacity Material:

Wet-laid High Dust Capacity material, frequently referred to herein as "wet-laid capacity paper" is bulkier, thicker and more permeable than the standard vacuum cleaner bag filter paper. It performs multiple functions. These include resisting shock loading, filtering of large dirt particles, filtering a significant portion of small dust particles, holding large amounts of particles while allowing air to flow through easily, thereby providing a low pressure drop at high particle loading which extends the life of the filter.

The wet-laid capacity paper usually comprises a fiber mixture of wood pulp fibers and synthetic fibers. It typically contains up to about 70% wood pulp and correspondingly more synthetic fiber, such as PET, than the standard paper described above. It has a greater thickness than the standard paper of about 0.32 mm at a typical basis weight of 50 g/$m^2$. Pore size also is much greater, in that the average pore size can be greater than 160 mm. Thus, the paper is able to hold much more dust in its pores before clogging up. Basis weight of the wet-laid capacity paper typically is about 30–150 g/m² and preferably about 50–80 g/m².

The wet-laid capacity paper has a fine dust particle filtration efficiency of about 66–67% as determined by the DIN 44956-2. Importantly, the wet-laid capacity paper has air permeability higher than the standard filter paper. The permeability lower limit thus preferably should be at least about 500 L/(m²×s), more preferably at least about 1,000 L/(m²×s) and most preferably at least about 2,000 L/(m²×s). The upper limit of permeability is defined to assure that the paper filters and holds a major fraction of the dust particles larger than about 10 mm. Consequently, a secondary high efficiency filter medium positioned downstream is able to filter out and contain fine particles much longer before showing indication of a substantial pressure drop increase across the filter. Accordingly, the air permeability of the wet-laid capacity paper preferably should be at most about 8,000 L/(m²×s), more preferably at most about 5,000 L/(m²×s), and most preferably at most about 4,000 L/(m²×s). It is thus seen that the wet-laid capacity paper is especially well designed as a multipurpose filtration tier to be positioned upstream of the secondary high efficiency filtration tier.

Dry-Laid High Dust Capacity Material:

Dry-laid high dust capacity material, sometimes referred to herein as "dry-laid capacity paper", had not been used as a filter in vacuum cleaner bags. Dry-laid paper is not formed from a water slurry, but is produced with air-laying technology and preferably by a "fluff pulp" process. Hydrogen-bonding which plays a large roll in attracting the molecular chains together does not operate in the absence of water. Thus, at the same basis weight, dry-laid capacity paper, is usually much thicker than standard paper and the wet-laid capacity paper. For a typical weight of 70 g/m², the thickness is 0.90 mm, for example.

The dry-laid capacity paper webs can be bonded primarily by two methods. The first method is latex bonding in which the latex binder may be applied from water-based dispersions. Saturation techniques such as spraying or dipping and squeezing (padder roll application) followed in both cases by a drying and beat curing process can be used. The latex binder may also be applied in discrete patterns such-as dots diamonds, cross hatches or wavy lines by gravure roll followed by drying and curing.

The second method is thermal bonding, for example by utilizing binder fibers. Binder fibers sometimes referred to herein as "thermally bondable fusing fibers" are defined by the Nonwoven Fabric Handbook, (1992 edition) as "Fibers with lower softening points than other fibers in the web. Upon the application of heat and pressure, these act as an adhesive." These thermally bondable fusing fibers generally completely melt at locations where sufficient heat and pressure are applied for the web, thereby adhering the matrix fibers together at their cross-over points. Examples include co-polyester polymers which when heated adhere a wide range of fibrous materials.

In a preferred embodiment thermal bonding can be accomplished by adding from at least 20% preferably up to 50% of a bicomponent ("B/C") polymer fiber to the dry-laid web. Examples of B/C fibers include fibers with a core of polypropylene ("PP") and a sheath of more heat sensitive polyethylene ("PE"). The term "heat sensitive" means that thermoplastic fibers soften and become sticky or heat fusible at a temperature of 3–5 degrees C. below the melting point. The sheath polymer preferably should have a melting point in the range of about 90–160 degrees C. and the core polymer should have a higher melting point, preferably by at least about 5 degrees C. higher than that of the sheath polymer. For example, PE melts at 121 degrees C. and PP melts at 161–163 degrees C. This aids in bonding the dry-laid web when it passes between the nip of a thermal calendar or into a through-air oven by achieving thermally bonded fibers with less beat and pressure to produce a less compacted, more open and breathable structure. In a more preferred embodiment the core of the core/sheath of the B/C fiber is located eccentric of the sheath. The more that the core is located towards one side of the fiber the more likely that the B/C fiber will crimp during the thermal bonding step, and thereby increase the bulk of the dry-laid capacity. This will, of course, improve its dust holding capacity. Thus, in a still further preferred embodiment the core and sheath are located side-by-side in the B/C fiber, and bonding is achieved with a through-air oven. A thermal calendar, which would compress the web more than through-air bonding and is less preferred in this case. Other polymer combinations that may be used in core/sheath or side-by-side B/C fibers include PP with co-polyester, low melting polymers, and polyester with nylon 6. The dry-laid high capacity tier can also be constituted essentially completely by bicomponent fibers. Other variations of bicomponent fibers in addition to "sheath/core", can be used, such as "side-by-side", "islands in the sea" and "orange" embodiments disclosed in Non-woven Textiles, Jirsak, O., and Wadsworth, L. C., Carolina Academic Press, Durham, N.C., 1999, pp. 26–29.

Generally, the average pore size of dry-laid capacity is intermediate between the pore size of the standard paper and wet-laid capacity paper The filtration efficiency as determined by the DIN 44956-2 Test is approximately 80%. Dry-laid capacity paper should have about the same basis weight and the same permeability as the wet-laid capacity paper described above, i.e., in the range of about 500–8,000 L/(m²×s), preferably about 1,000–5,000 L/(m²×s) and most preferably about 2,000–4,000 L/(m²×s). It has excellent dust holding capacity and has the advantage of being much more uniform in weight and thickness than the wet-laid papers.

Several preferred embodiments of dry-laid capacity paper are contemplated. One is a latex bonded fluff pulp fiber composition. That is, the fibers comprising the paper consist essentially of fluff pulp. The term "fluff pulp" means a nonwoven component of the filter of this invention which is prepared by mechanically grinding rolls of pulp, i.e., fibrous cellulose material of wood or cotton, then aerodynamically transporting the pulp to web forming components of air laying or dry forming machines. A Wiley Mill can be used to grind the pulp. So-called Dan Web or M and J machines are used for dry forming. A fluff pulp component and the dry-laid tiers of fluff pulp are isotropic and are thus characterized by random fiber orientation in the direction of all three orthogonal dimensions. That is, they have a large portion of fibers oriented away from the plane of the nonwoven web, and particularly perpendicular to the plane, as compared to three-dimensionally anisotropic nonwoven webs. Fibers of fluff pulp utilized in this invention preferably are from about 0.5–5 mm long. The fibers are held together by a latex binder. The binder can be applied either as powder or emulsion.

Binder is usually present in the dry-laid capacity paper in the range of about 10–30 wt % and preferably about 20–30 wt % binder solids based on weight of fibers.

Another preferred embodiment the dry-laid capacity paper comprises a thermally bonded blend of fluff pulp fibers and at least one of "split film fibers" and bicomponent polymer fibers. More preferably, the blend of fluff pulp fibers comprises fluff pulp fibers and bicomponent polymer fibers.

Split Film Fibers:

Split film fibers are essentially flat, rectangular fibers which may be electrostatically charged before or after being incorporated into the composite structure of the invention. The thickness of the split film fibers may range from 2–100 micrometers, the width may range from 5 micrometers to 500 micrometers, and the length may range from 0.5 to 15 mm. However, the preferred dimensions of the split film fibers are a thickness of about 5 to 20 micrometers, a width of about 15 to 60 micrometers, and a length of about 0.5 to 8 mm.

The split film fibers of the invention are preferably made of a polyolefin, such as polypropylene. However, any polymer which is suitable for making fibers may be used for the split film fibers of the composite structures of the invention. Examples of suitable polymers include, but are not limited to, polyolefins like homopolymers and copolymers of polyethylene, polyterephthalates, such as poly(ethylene terephthalate) (PET), poly(butylene terephthalate) (PBT), poly(cyclohexyl-dimethylene terephthalate) (PCT), polycarbonate, and polychlorotrifluoroethylene (PCTFE). Other suitable polymers include nylons, polyamides, polystyrenes, poly-4-methylpentene-1, polymethylmethacrylates, polyurethanes, silicones, polyphenylene sulfides. The split film fibers may also comprise a mixture of homopolymers or copolymers. In the present application, the invention is exemplified with split film fibers made of polypropylene.

The use of PP polymers with various molecular weights and morphologies in laminate film structures has been shown to produce films with a proper balance of mechanical properties and brittleness required to produce split film fibers. These PP split film fibers may also be subsequently given the desired level of crimp. All dimensions of the split film fibers may, of course, be varied during manufacture of the fibers.

One method for production of the split fibers, is disclosed in U.S. Pat. No. 4,178,157. Polypropylene is melted and extruded into a film which is then blown into a large tube (balloon) into which ambient air is introduced or allowed to enter, in accordance with conventional blow stretching technology. Inflating the balloon with air serves to quench the film and to bi-axially orient the molecular structure of the PP molecular chains, resulting in greater strength. The balloon is then collapsed and the film is stretched between two or more pairs of rollers in which the film is held in the nip of two contacting rollers, with the application of varying amounts of pressure between the two contacting rollers. This results in an additional stretch in the machine direction which is accomplished by driving the second set of rollers at a faster surface speed than the first set. The result is an even greater molecular orientation to the film in the machine direction which will subsequently become the long dimension of the split film fibers.

The film may be electrostatically charged before or after it has been cooled down. Although various electrostatic charging techniques may be employed to charge the film, two methods have been found to be most preferable. The first method involves passing the film about midway in a gap of about 1.5 to 3 inches between two DC corona electrodes. Corona bars with emitter pins of metallic wire may be used in which one corona electrode has a positive DC voltage potential of about 20 to 30 kV and the opposing electrode has a negative DC voltage of about 20 to 30 kV.

The second, preferred, method utilizes the electrostatic charging technologies described in U.S. Pat. No. 5,401,446 (Wadsworth and Tsai, 1995), which is referred to as Tantret (tm) Technique I and Technique II, which are further described herein. It has been found that Technique II, in which the film is suspended on insulated rollers as the film passes around the inside circumference of two negatively charged metal shells with a positive corona wire of each shell, imparts the highest voltage potentials to the films. Generally, with Technique II, positive 1,000 to 3,000 volts or more may be imparted to on one side of the films with similar magnitudes of negative volts on the other side of the charged film. Technique I, wherein films contact a metal roller with a DC voltage of −1- to −10 kV and a wire having a DC voltage of +20 to +40 kV is placed from about 1 to 2 inches above the negatively biased roller with each side of the film being exposed in succession to this roller/wire charging configuration, results in lower voltage potentials as measured on the surfaces of the films. With Technique I, voltages of 300 to 1,500 volts on the film surface with generally equal but opposite polarities on each side are typically obtained. The higher surface potentials obtained by Technique II, however, have not been found to result in better measurable filtration efficiencies of the webs made from the split film fibers. Therefore, and because it is easier to lace up and pass the film through the Technique I device, this method is now predominately used to charge the films prior to the splitting process.

The cooled and stretched film may be hot or cold electrostatically charged. The film is then simultaneously stretched and split to narrow widths, typically up to about 50 micrometers. The split, flat filaments are then gathered into a tow which is crimped in a controlled numbers of crimps per centimeter and then cut into the desired staple length.

In a particularly preferred embodiment, the dry-laid high dust capacity paper comprises a blend of all of fluff pulp fibers, bicomponent polymer fibers, and electrostatically charged split film fibers. Preferably, the fluff pulp fibers will be present at about 5–85 wt %, more preferably about 10–70 wt %, and most preferably about 40 wt %, the bicomponent fibers at about 10–60 wt %, more preferably about 10–30 wt % and most preferably about 20 wt %, and the electrostatically charged split film fibers at about 20–80 wt %, and more preferably about 40 wt %. This dry-laid high dust capacity may be thermally bonded, preferably at a high temperature of 90–160 degrees C., more preferably, at a temperature lower than 110 degrees C. and most preferably at about 90 degrees C.

Mixed Electrostatic Fibers:

Other preferred embodiments of the dry-laid capacity paper comprises a thermally bonded paper with 100% "mixed electrostatic fibers", a blend of 20–80% mixed electrostatic fibers and 20–80% B/C fibers, and a blend of 20–80% mixed electrostatic fibers, 110–70% fluff pulp and 10–70% B/C fibers. "Mixed electrostatic fiber" filters are made by blending fibers with widely different triboelectric properties and rubbing them against each other or against the metal parts of machines, such as wires on carding cylinders during carding. This makes one of the types of fibers more positively or negatively charged with respect to the other type of fiber, and enhances the coulombic attraction for dust particles. The production of filters with these types of mixed electrostatic fibers is taught in U.S. Pat. No. 5,470,485 and in European Patent Application EP 0 246 811.

In U.S. Pat. No. 5,470,485, the filter material consists of a blend of (I) polyolefin fibers and (II) polyacrylonitrile fibers. The fibers (I) are bicomponent PP/PE fibers of the core/sheath or side-by-side type. The fibers 11 are "halogen free". The (I) fibers also have some "halogen-substituted polyolefins": whereas, the acrylonitrile fibers have no halogen. The patent notes that the fibers must be thoroughly washed with nonionic detergent, with alkali, or solvent and then well rinsed before being mixed together so that they do not have any lubricants or antistatic agents. Although the patent teaches that the fiber mat produced should be needle-punched, these fibers could also be cut to lengths of 5–20 mm and mixed with similar length bicomponent thermal binder fibers and also with the possible addition of fluff pulp so that dry-laid thermally bonded paper can be utilized in this invention.

EP 0 246 811 describes the triboelectric effect of rubbing two different types of fibers together. It teaches using similar types of fibers as U.S. Pat. No. 5,470,485, except that the —CN groups of the polyacrylonitrile fibers may be substituted by halogen (preferably fluorine or chlorine). After a sufficient amount of substitution of —CN by —Cl groups, the fiber may be referred to as a "modacrylic" if the copolymer comprises from 35 to 85% weight percent acrylonitrile units. EP 0 246 811 teaches that the ratio of polyolefin to substituted acrylonitrile (preferably modacrylic) may range from 30:70 to 80:20 by surface area, and more preferably from 40:60 to 70:30. Similarly, U.S. Pat. No. 5,470,485 teaches that the ratio of polyolefin to polyacrylonitrile fibers is in the range of 30:70 to 80:20, relative to a surface of the filter material. Thus, these ranges of ratios of polyolefin to acrylic or modacrylic fibers may be used in the above stated proportions in the dry-laid thermally bonded capacity paper.

Meltblown Fleece:

A synthetic polymer fiber meltblown fleece can optionally be deployed as an tier between a multipurpose tier and a high efficiency filtration tier. The meltblown fleece tier increases overall filtration efficiency by capturing some particles passed by the multipurpose filtration tier. The meltblown fleece tier also optionally can be electrostatically charged to assist in filtering fine dust particles. Inclusion of a meltblown fleece tier involves an increase in pressure drop at given dust loading as compared to composites not having a meltblown fleece ter.

The meltblown fleece preferably has a basis weight of about 10–50 g/m$^2$ and air permeability of about 100–1,500 L/(m$^2$xs).

High Bulk Meltblown Nonwoven:

Another discovery from recent research to develop improved vacuum cleaner bags was the development of a high bulk MB web or tier which could be used upstream of a filtration grade MB fleece as a pre-filter in place of the wet-laid capacity paper or dry-laid capacity paper. The high bulk MB pre-filter can be made in a meltblowing process using chilled quench air with a temperature of about 10 degrees C. In contrast, conventional MB normally uses room air at an ambient temperature of 35–45 degrees C. Also the collecting distance from the MB die exit to the web take-up conveyer is increased to 400–600 mm in the high bulk MB process. The distance normally is about 200 mm for regular MB production. Additionally, high bulk MB nonwoven is made by using a lower temperature attenuation air temperature of about 215–235 degrees C. instead of the normal attenuation air temperature of 280–290 degrees C., and a lower MB melt temperature of about 200–225 degrees C. compared to 260–280 degrees C. for filtration grade MB production. The colder quench air, lower attenuation air temperature, lower melt temperature and the longer collecting distance cool down the MB filaments more. Removing beat results in less draw down of the filaments, and hence, in larger fiber diameters than would be found in typical filtration grade MB webs. The cooler filaments are much less likely to thermally fuse together when deposited onto the collector. Thus, the High Bulk Meltblown nonwoven would have more open area. Even with a basis weight of 120 g/m$^2$, the air permeability of the High Bulk Meltblown nonwoven is 806 L/(m$^2$xs). By contrast, a much-lighter (e.g., 22 g/m$^2$) filtration grade MB PP web had a maximum air permeability of only 450 L/(m$^2$xs). The filtration efficiency of the High Bulk MB nonwoven as determined by the DIN 44956-2 Test was 98%. When the two were put together with the High Bulk MB nonwoven on the inside of the bag, the air permeability was still 295 L/(m$^2$xs), and the filtration efficiency of the pair was 99.8%. The high bulk meltblown nonwoven can be uncharged, or optionally electrostatically charged provided that the nonwoven is of material having suitable dielectric properties.

High Bulk MB nonwoven of this invention should be distinguished from "filtration grade MB" which also is employed in the multitier vacuum filter structure of this disclosure. Filtration grade MB web is a conventional melt-blown nonwoven generally characterized by a low basis weight typically of about 22 g/m$^2$, and a small pore size. Additional typical characteristics of filtration grade MB nonwoven of polypropylene are shown in Table 1. A preferred high bulk MB nonwoven of polypropylene optimally includes about 5–20 wt % ethylene vinyl acetate. Filtration grade MB nonwoven has generally high dust removal efficiency, i.e., greater than about 99%.

TABLE I

|  | Preferred | More Preferred | Most Preferred |
|---|---|---|---|
| Filtration Grade MB PP | | | |
| Weight g/m$^2$ | 5–100 | 10–50 | 25 |
| Thickness, mm | 0.10–2 | 0.10–1 | 0.26 |
| Air Permeability, L/(m$^2$ × s) | 100–5,000 | 100–2,000 | 450 |
| Tensile Strength, MD, N | 0.5–15 | 1.0–10 | 3.7 |
| Tensile Strength, CD, N | 0.5–15 | 1.0–10 | 3.2 |
| Fiber Diameter, mm | 1–15 | 1–5 | 2–3 |
| High Bulk MB PP | | | |
| Weight, g/m$^2$ | 30–180 | 60–120 | 80 |
| Thickness, min | 0.3–3 | 0.5–2 | 1.4 |
| Air permeability, L/(m$^2$ × s) | 300–8,000 | 600–3,000 | 2,000 |
| Tensile Strength, MD, N | 1.0–30 | 2–20 | 10 |
| Tensile Strength, CD, N | 1.0–30 | 2–20 | 9.2 |
| Fiber Diameter, mm | 5–20 | 10–15 | 10–12 |

High Bulk MB nonwoven is similar in filter efficiency to dry-laid and wet-laid capacity papers mentioned above. Thus, High Bulk MB nonwoven is well-adapted to remove large quantities of large dust particles and to hold large amounts of dust. Accordingly, High Bulk MB nonwoven tier is suited for placement upstream of and as a pre-filter for a filtration grade MB tier in a vacuum filter structure of this invention.

Spunblown (Modular) Nonwoven:

A new type of meltblowing technology described in Ward, G., Nonwovens World, Summer 1998, pp. 37–40 is available to produce a Spunblown (Modular) Nonwoven suitable for use as a coarse filter tier in the present invention. Optionally, the Spunblown Nonwoven can be utilized as a filtration grade meltblown fleece tier as called for in the novel structure. Specifications of the Spunblown (Modular) Nonwoven are presented in Table II.

The process for making the Spunblown (Modular) Nonwoven is generally a meltblown procedure with a more rugged modular die and using colder attenuation air. These conditions produce a coarse meltblown web with higher strength and air permeability at comparable basis weight of conventional meltblown webs.

Microdenier Spunbond Nonwoven:

A spunbond ("SB") nonwoven, occasionally referred to herein as microdenier spunbond can also be utilized in this invention in the same way as the coarse filter tier or the filtration grade meltblown fleece tier previously mentioned. Specifications of microdenier spunbond are listed in Table II. Microdenier spunbond is particularly characterized by filaments of less than 12 mm diameter which corresponds to 0.10 denier for polypropylene. In comparison, conventional SB webs for disposables typically have filament diameters which average 20 mm. Microdenier spunbond can be obtained from Reifenhauser GmbH (Reicofil III), Koby Steel, Ltd., (Kobe-Kodoshi Spunbond Technology) and Ason Engineering, Inc. (Ason Spunbond Technology).

TABLE II

| | Preferred | More Preferred | Most Preferred |
|---|---|---|---|
| Spunblown (Modular) | | | |
| Weight g/m² | 10–150 | 10–50 | 28 |
| Thickness, mm | 0.20–2 | 0.20–1.5 | 0.79 |
| Air permeability, L/(m² × s) | 200–4,000 | 300–3,000 | 1,200 |
| Tensile Strength, MD, N | 10–60 | 15–40 | 43 |
| Tensile Strength, CD, N | 10–50 | 12–30 | 32 |
| Fiber Diameter, micrometer | 0.6–20 | 2–10 | 2–4 |
| microdenier spunbond PP (Ason, Kobe-Kodoshi, Reicofil III) | | | |
| Weight, g/m² | 10–50 | 20–30 | 17 |
| Thickness, mm | 0.10–0.6 | 0.15–0.5 | 0.25 |
| Air permeability, L/(m² × s) | 1,000–10,000 | 2,000–6,000 | 2,500 |
| Tensile Strength, MD, N | 10–100 | 20–80 | 50 |
| Tensile Strength, CD, N | 10–80 | 10–60 | 40 |
| Fiber Diameter, micrometer | 4–18 | 6–12 | 10 |

Preferred Embodiments

Representative products according to the present invention are illustrated schematically in FIGS. 1, 3–13, and described in greater detail as follows. In the figures, air flow direction is indicated by arrow A.

In FIG. 1, a unitary composite filter 36 made from two tiers is depicted. The upstream (dirty air side) tier 37 is a Dry-Laid FP Capacity tier with the broadest weight of 10–150 g/m², typical weight range of 20–80 g/m² and with a preferred weight of 75 g/m². The FP layer 37 has different blends of pulp fibers and bicomponent (B/C) fibers. The bicomponent fibers comprise 60% PE and 40% PP. The downstream tier 38 is a high efficiency MB component with a weight of 5–100 g/m², preferably 24 g/m². Notably, the independently composed tiers 37 and 38 meet at interface 36A. This interface is different from that in a laminate of two pre-bonded layers in a multilayer composite. Due to the fact that formation of a pre-bonded layer is not needed to produce the structure 36, at least one of tiers 37 and 38 can be sufficiently flimsy that it could not be formed into a free standing web to be incorporated as a layer in a conventional multilayer composite.

The upstream tier has an absolute pore volume of 21.4 cm³/g, the downstream tier of 7.7 cm³/g, resulting in an ratio of absolute pore volume RAPV=2.78. The absolute projected fiber coverage, i.e. the unit area which is covered by fibers when perpendicularly looking at the tier, of the upstream tier APFC is 97.7%. APFC of the downstream tier is 99.3%.

To optimize the dust holding capacity, a ratio of average pore diameter of upstream tier to downstream tier of 6.21 is realized, the average pore diameter of the upstream tier being 87 micrometer, the average pore size of the downstream tier being 14 micrometer.

In order to obtain the above RAPV and APFC values, the upstream tier comprises a thickness of 1.7 mm, an apparent density of 0.044 g/cm³, and a relative pore volume of 94.4%. The downstream tier comprises a thickness of 0.21 mm, an apparent density of 0.11 g/cm³, and a relative pore volume of 87.4%. It is understood that these values are exemplary only; in particular the above RAPV and APFC values can also be obtained with different thickness, apparent density, and relative pore volume.

Figure 2:
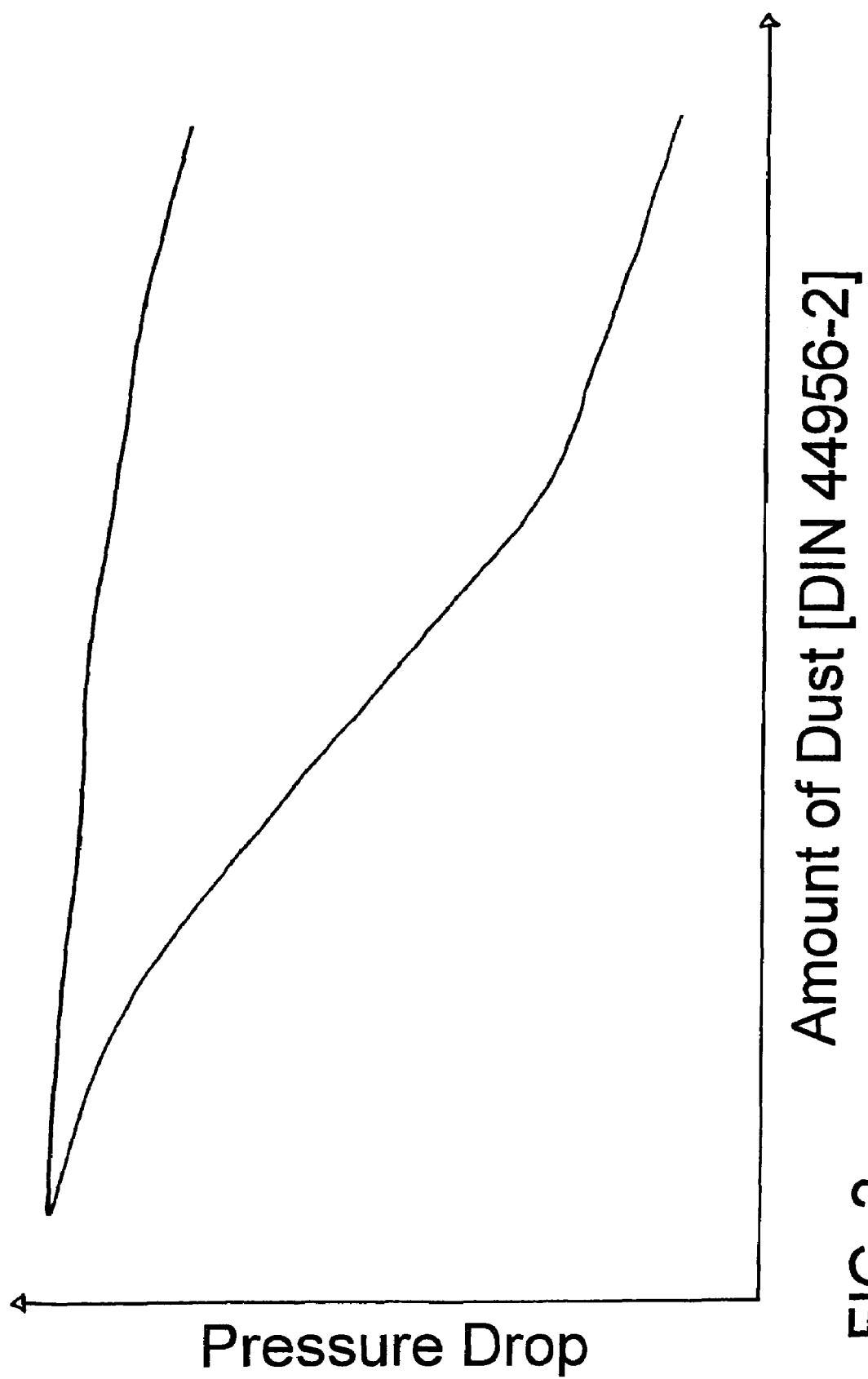
FIG. 2 is a diagram showing the pressure drop of the composite filter in FIG. 1 and a composite prior art filter.

FIG. 2 illustrates the highly improved pressure drop across the filter depending on the amount of dust filtered by the composite filter. The upper curve shows the composite filter with the characteristics discussed above. The lower curve shows a prior art filter, consisting of a spunbond as upstream tier and a meltblown as downstream tier. The prior art upstream tier has an absolute pore volume of 6.9 cm³/g, the downstream tier of 8.1 cm³/g, resulting in an ratio of absolute pore volume RAPV=0.85. The absolute projected fiber coverage of the upstream tier is APFC 69.3%. APFC of the downstream tier is 92.3%.

A further embodiment (not shown) has the same structure as the embodiment shown in FIG. 1. This embodiment, however, comprises an upstream tier in form of a Dry-Laid FP Capacity tier with a weight of 50 g/m². The FP layer has different blends of pulp fibers and bicomponent (B/C) fibers. The bicomponent fibers comprise 60% PE and 40% PP. The downstream tier is a high efficiency MB component with a weight of 24 g/m². The upstream tier has an absolute pore volume of 22.7 cm³/g, the downstream tier of 7.7 cm³/g, resulting in an ratio of absolute pore volume RAPV=2.95. The absolute projected fiber coverage of the upstream tier is APFC 99.9%. APFC of the downstream tier is 99.3%.

To optimize the dust holding capacity, a ratio of average pore diameter of upstream tier to downstream tier of 5.93 is realized, the average pore diameter of the upstream tier being 83 micrometer, the average pore size of the downstream tier being 14 micrometer.

In order to obtain the RAPV and APFC values, the upstream tier comprises a thickness of 1.2 mm, an apparent density of 0.042 g/cm³, and a relative pore volume of 94.7%. The downstream tier comprises a thickness of 0.21 mm, an apparent density of 0.11 g/cm³, and a relative pore volume of 87.4%.

In a further embodiment (not shown) the upstream tier comprises split film fibers and "mixed electrostatic fibers." Split film fibers and "mixed electrostatic fibers" are not used in all variations of the upstream tier, but at least 10% and preferably at least 20% B/C fibers or other types of thermally bondable fusing fibers should be used to achieve adequate thermal bonding. Generally, at least 10% and preferably at least 20% pulp fibers are used for enhanced cover and filtration efficiency. The tier can be free of B/C fibers or other types of thermally bondable fusing fibers if latex binder is used.

Figure 3:
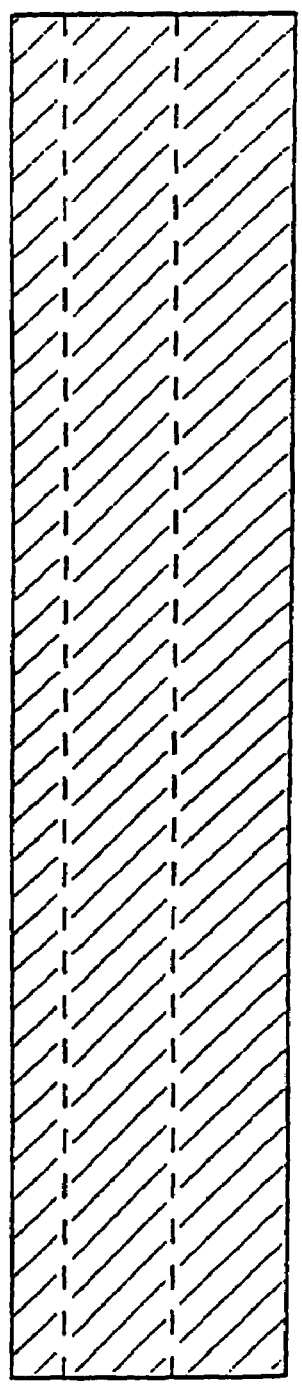
FIG. 3 is a schematic diagram showing in cross section another embodiment of the composite filter in accordance with the invention having a unitary stratified structure of three tiers.

FIG. 3 depicts a unitary composite filter 39 composed of three tiers. The first tier 40 is a coarse drylaid component made of 100% B/C fibers. It mainly serves as a pre-filter and protects downstream filter material. The broadest weight range is 10–100 g/m², with a typical weight range of 20–80 g/m², and a preferred weight of 50 g/m². The upstream tier 41 is a Dry-Laid FP Capacity component as discussed in the above embodiments. The downstream tier 42 consists of high filtration efficiency MB media or other ultrafine fiber diameter materials such as SpunBlown Modular or Microdenier Spunbond.

Figure 4:
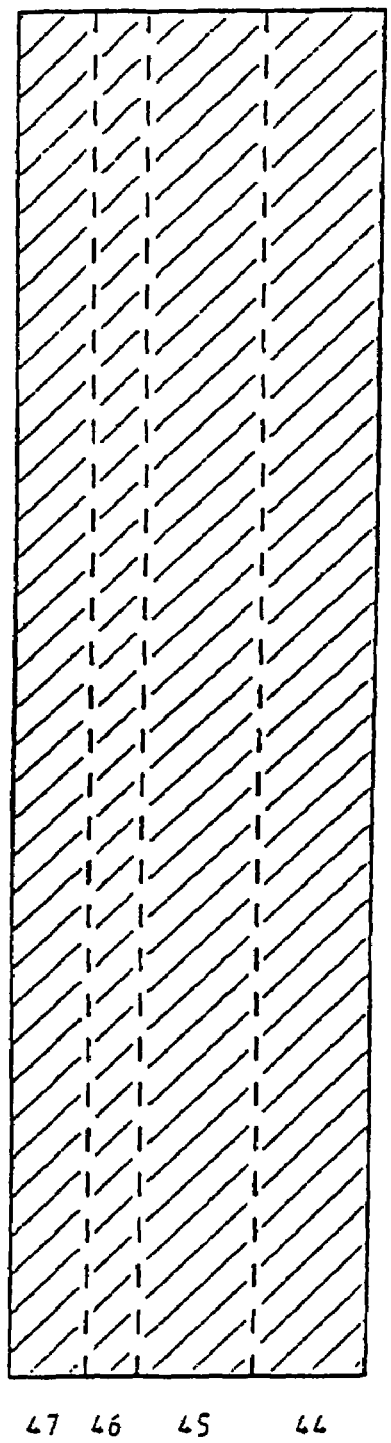
FIG. 4 is a schematic diagram showing in cross section another embodiment of the composite filter in accordance with the invention having a unitary stratified structure of four tiers.

FIG. 4 is a diagram of a unitary composite filter 43 made from four tiers of material. The first tier 44 is composed of Dry-Laid FP of 100% B/C fibers. The broadest weight range is from 10–100 g/m², typical weight is from 20–80 g/m² and the target weight is 50 g/m². The upstream tier 45 is a Dry-Laid FP Capacity tier as discussed in the above embodiments. Alternatively, tier 45 may contain at least 10% and preferably at least 20% B/C fibers, 10% and preferably at least 20% pulp fibers, and may contain varying amounts of charged or uncharged split film fibers. It may contain varying amounts of "mixed electrostatic fibers". At least 10% and preferably at least 20% BIC fibers or other types of thermally bondable fusing fibers should be used to achieve adequate thermal bonding. Generally, at least 10% and preferably at least 20% pulp fibers are used for enhanced cover and filtration efficiency. The tier can be free of B/C fibers or other types of thermally bondable fusing fibers if latex binder is used. The downstream tier 46 contains MB filter media as discussed with respect to the above embodiments. The outer tier 47 is a Dry-Laid FP composed of air-laid pulp and B/C fibers.

Figure 5:
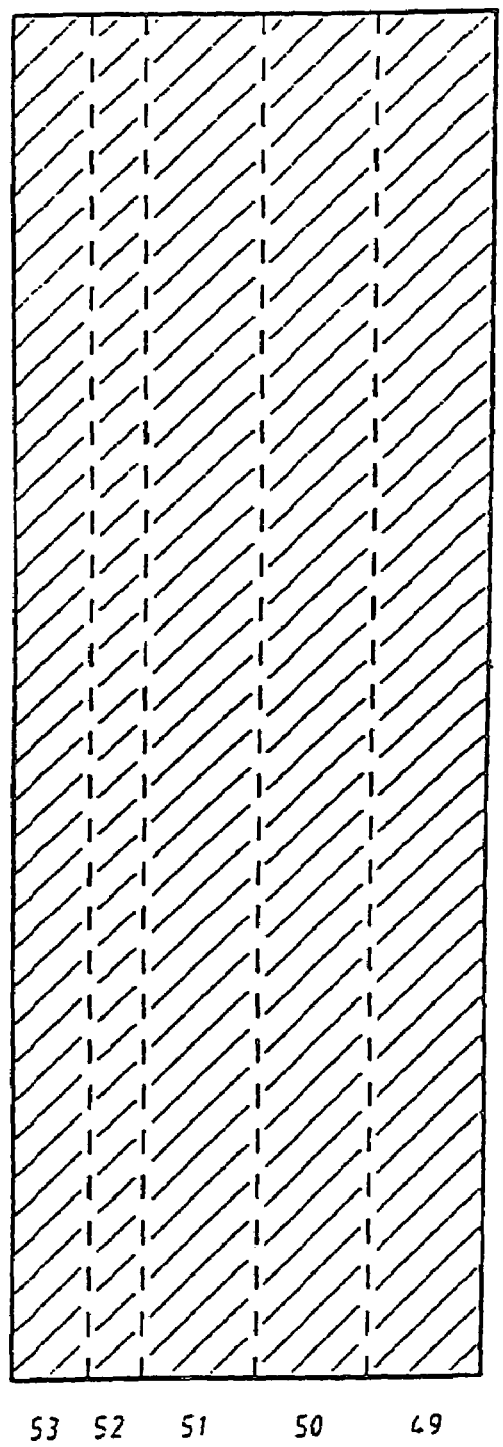
FIG. 5 is a schematic diagram showing in cross section another embodiment of the composite filter in accordance with the invention having a unitary stratified structure of five tiers.

FIG. 5 is a diagram of a unitary composite filter 48 made from five tiers of material. The first tier 49 is composed of Dry-Laid FP of 100% B/C fibers. The broadest weight range is from 10–100 g/m², typical weight is from 20–80 g/m² and the target weight is 50 g/m². The upstream tier 50 is a Dry-Laid FP Capacity component as discussed above. Component 51 contains carbon granules or carbon fibers to absorb odors and to remove pollutant and toxic gases from the air. Component 52 is a high filtration efficiency MB as discussed with respect to the above embodiments. Component 53 is a Dry-Laid FP composed of air-laid pulp and B/C fibers.

Figure 6:
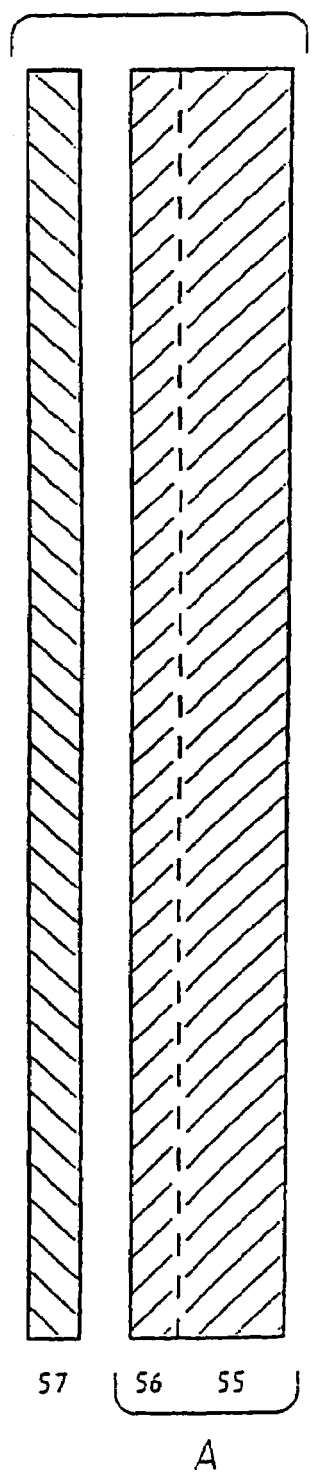
FIG. 6 is a schematic diagram showing in cross section another embodiment of the two-tiered composite filter of FIG. 1 in combination with a filter layer adjacent thereto.

FIG. 6 depicts a unitary composite filter 54 of the same construction as shown in FIG. 1, composed of two tiers 55, 56, bonded to a supporting outer layer 57 consisting of a paper, scrim or nonwoven with a weight ranging from 10–100 g/m².

Figure 7:
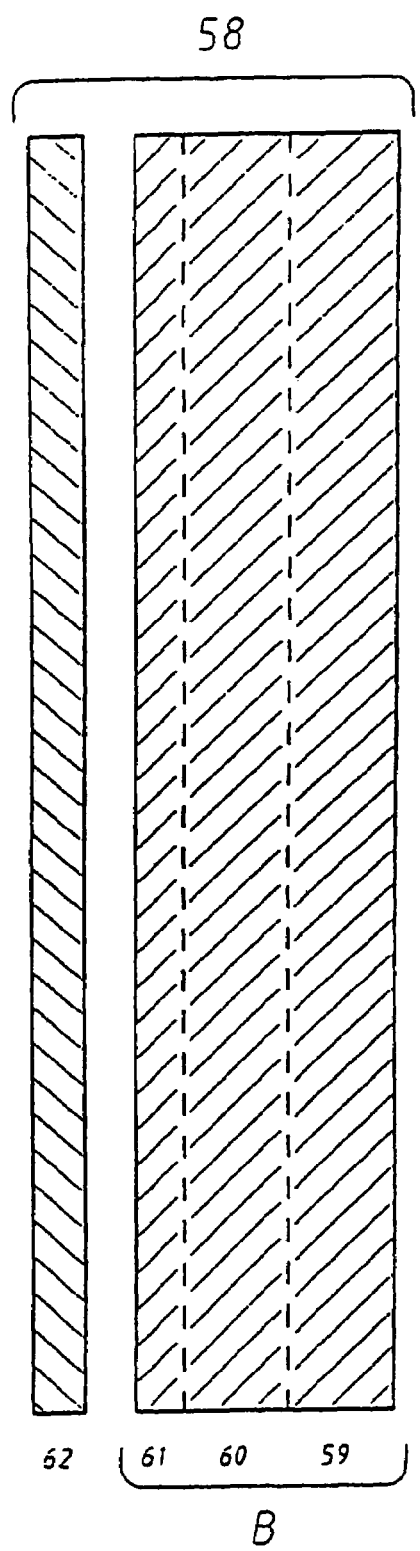
FIG. 7 is a schematic diagram showing in cross section another embodiment of the three-tiered composite filter of FIG. 3 in combination with a filter layer adjacent thereto.

FIG. 7 depicts a unitary composite filter 58 of the same construction as shown in FIG. 3, composed of three tiers 59, 60 and 61, bonded to an outer layer 62 consisting of a paper, scrim or nonwoven with a weight ranging from 10–100 g/m².

Figure 8:
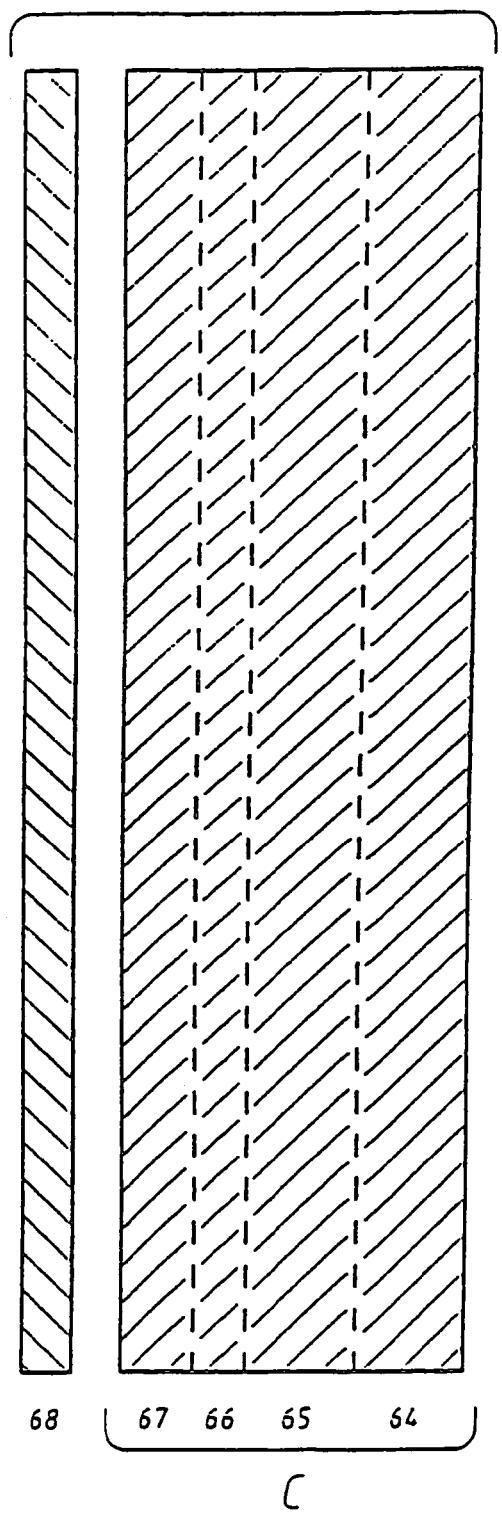
FIG. 8 is a schematic diagram showing in cross section another embodiment of the four-tiered composite filter of FIG. 4 in combination with a filter layer adjacent thereto.

FIG. 8 depicts a unitary composite filter 63 of the same construction as FIG. 4, composed of four tiers 64–67, bonded to an outer layer 68 consisting of a paper, scrim or nonwoven with a weight of 10–100 g/m².

Figure 9:
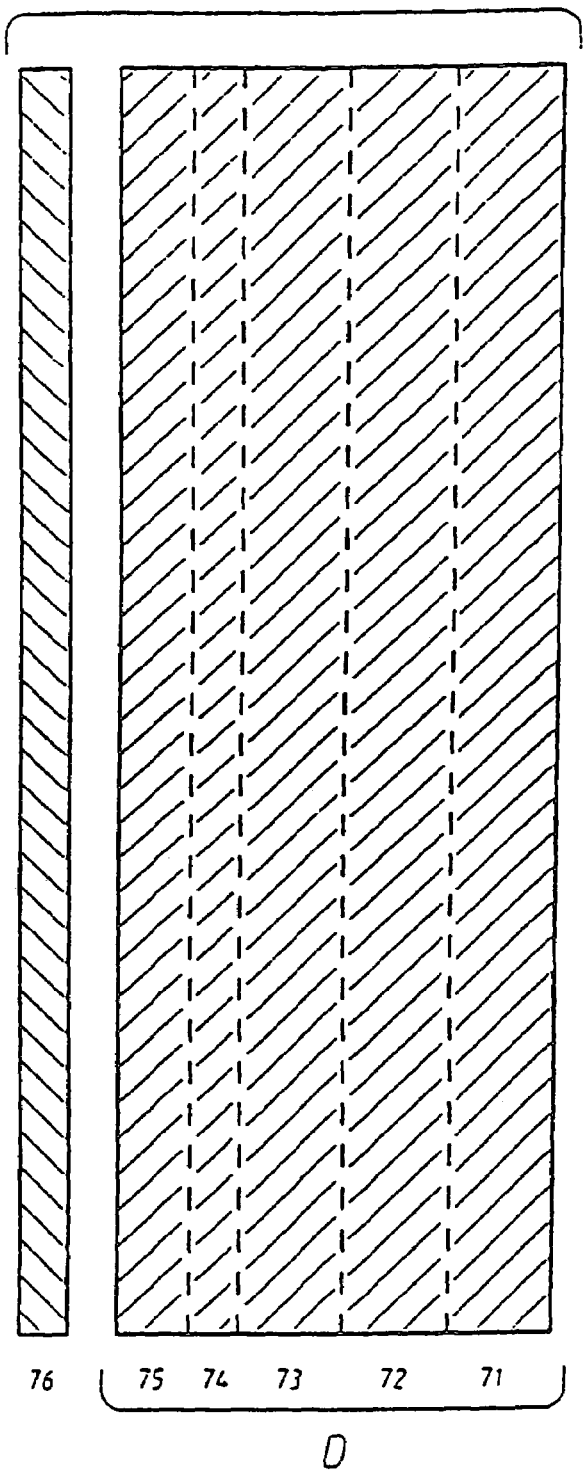
FIG. 9 is a schematic diagram showing in cross section another embodiment of the five-tiered composite filter of FIG. 5 in combination with a filter layer adjacent thereto.

FIG. 9 depicts a unitary composite filter 69 of the same construction as FIG. 5, composed of five tiers 71–75, bonded to an outer layer 76 consisting of a paper, scrim or nonwoven with a weight of 10–100 g/m².

Figure 10:
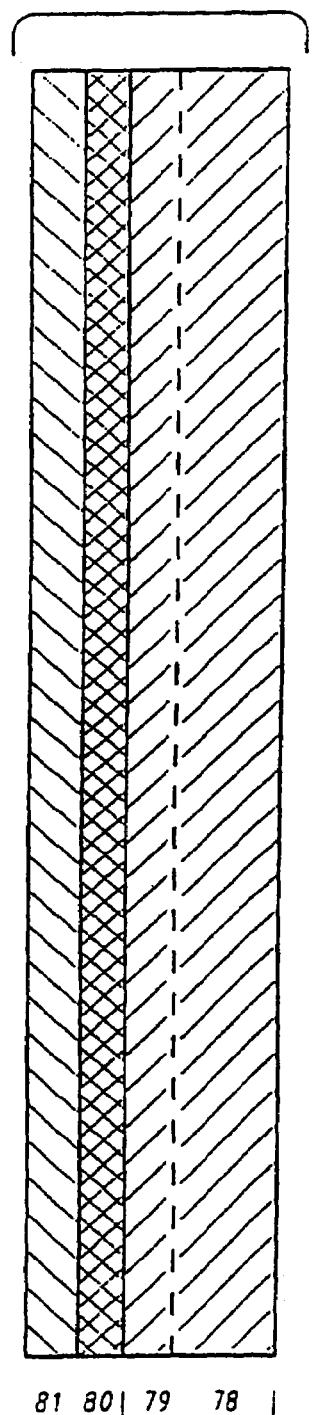
FIG. 10 is a schematic cross section diagram showing the two-tiered composite filter of FIG. 6 bonded to an adjacent filter layer with an adhesive or ultrasonically bonded layer.

FIG. 10 depicts a laminate of unitary composite filter 77 of the same construction as shown in FIG. 1, composed of two tiers 78, 79, bonded to a supporting outer layer 81 consisting of a paper, scrim or nonwoven with a weight ranging from 10–100 g/m², wherein the outer layer is bonded by glue or an adhesive 80, in which the latter could be a latex binder or a hot melt adhesive.

Figure 11:
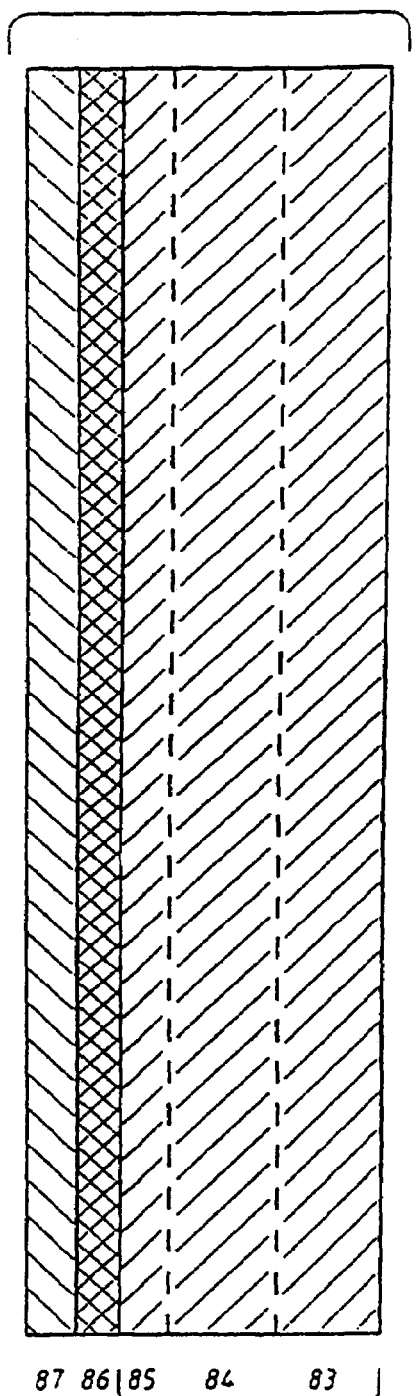
FIG. 11 is a schematic cross section diagram showing the three-tiered composite filter of FIG. 7 bonded to an adjacent filter layer with an adhesive or ultrasonically bonded layer.

FIG. 11 depicts a laminate of unitary composite filter 82 of the same construction as shown in FIG. 3, composed of three tiers 83–85, to an outer layer 87 consisting of a paper, scrim or nonwoven with a weight ranging from 10–100 g/m², wherein the outer layer is bonded by glue or an adhesive 86.

Figure 12:
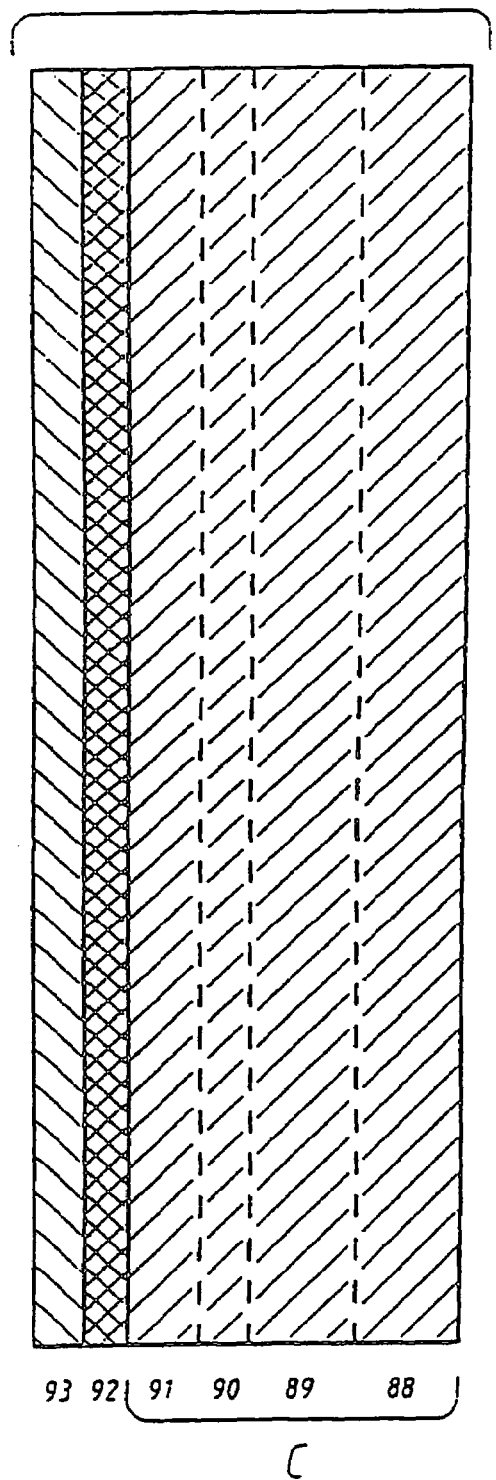
FIG. 12 is a schematic cross section diagram showing the four-tiered composite filter of FIG. 8 bonded to an adjacent filter layer with an adhesive or ultrasonically bonded layer.

FIG. 12 depicts a laminate of unitary composite filter 87A of the same construction as FIG. 4, composed of four tiers 88–91, to an outer layer 93 consisting of a paper, scrim or nonwoven with a weight of 10–100 g1mA², wherein the outer layer is bonded by glue or an adhesive 92.

Figure 13:
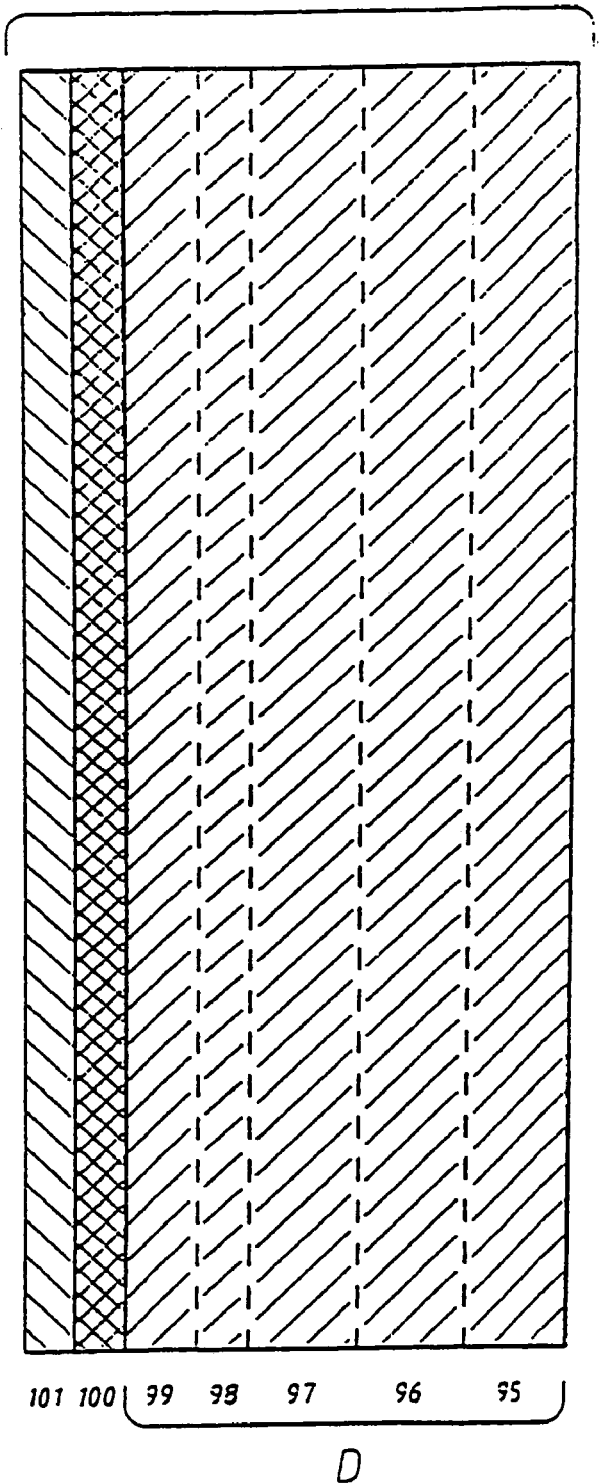
FIG. 13 is a schematic cross section diagram showing the five-tiered composite filter of FIG. 9 bonded to an adjacent filter layer with an adhesive or ultrasonically bonded layer.

FIG. 13 depicts a laminate of unitary composite filter 94 of the same construction as FIG. 5, composed of five tiers 95–99, to an outer layer 101 consisting of a paper, scrim, or nonwoven with a weight of 10–100 g/mA², wherein the outer layer is bonded by glue or an adhesive 100.

Where bonding between layers is indicated in embodiments of FIGS. 10–13, conventional interlayer bonding methods, such as ultrasonic bonding can be used in place of or in conjunction with glue/adhesive bonding mentioned above.

Figure 14:
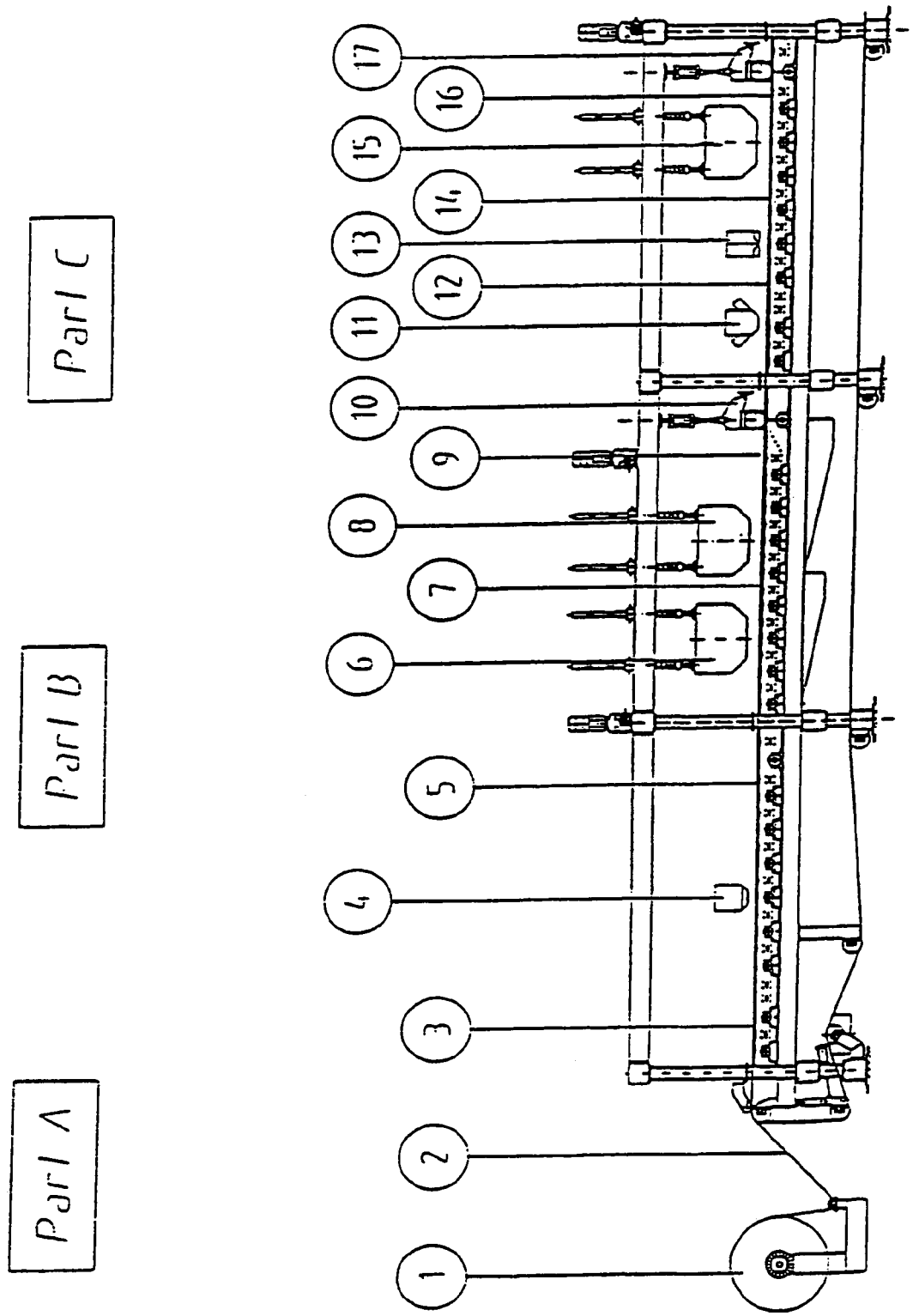
FIG. 14 is a schematic diagram of an inline process for producing a composite filter according to a preferred embodiment of the present invention.

A preferred process for producing an embodiment of the novel composite filter comprising a unitary stratified structure of MB and FP compositions is shown in FIG. 14. The illustrated process provides a product laminated to a scrim, paper or nonwoven to facilitate handling, pleating or packaging. It is also possible to provide an unlaminated composite filter by replacing the scrim, paper or nonwoven with a supporting conveyor to carry the non-prebonded tiers through the process. The final unitary composite filter consists of at least two-tiers, although each tier may contain more than one type of fiber or other materials as discussed above, and generally consists of three to five tiers, which are thermally or latex bonded. The electrostatic charging of the composite filter is preferably done in-line by the Tantret "cold" electrostatic charging process, although MB fibers may be "hot" charged in-line upon exiting the MB die. Also, split film fibers, which were electrostatically charged during their production, may be introduced by the FP applicators. Furthermore, "mixed electrostatic fibers" which have opposite polarities after rubbing against each other due to different triboelectric properties may be incorporated into the composite by the FP applicators.

Now referring to FIG. 14, an optional unwind I is located at the starting end of the line to allow for the feeding in of an optional support layer 2, which may be a scrim, paper or nonwoven. Components 1, 2, 4 and 5 are optional in that the inventive unitary composite filter is laminated to a scrim, paper or nonwoven only to facilitate handling, pleating or packaging. A conveyor belt 3 runs the entire length of the line; however, it may also be separated into shorter sections with one conveyer section feeding the assembly of tiers onto the next sections as required in the process. Also at the starting end of the line there is an optional adhesive applicator 4 for dispensing an adhesive 5 in the form of glue or hot melt adhesive. This adhesive application station can be utilized when it is desired to in-line laminate a supporting layer to the unitary stratified structure of the novel composite. However, it should be noted that applicator 4 is not intended for pre-bonding tiers within the stratified structure.

Next, as shown in FIG. 14, there are at least one, and preferably two, FP applicator units 6 and 8. The primary function of the FP applicator units at the beginning of the line is to produce and deposit dry-laid tiers 7 and 9 onto the optional adhesive tier 5, or onto the conveyor belt 3 if the optional support layer 2 and adhesive 5 are not used. The dry-laid tiers 7 and 9 may be the same or have different compositions and properties to meet the requirements of the end product. In any respect, the role of tiers 7 and 9 is primarily to support and protect the MB or related filter media tiers 12 and 14. In the illustrated embodiment, the FP tiers 7 and 9 are primarily composed of "pulp" and bicomponent (B/C) fibers. Different types of B/C fibers may be used as described above. For example, a preferred type has a core of higher melting point fibir such as PP and a sheath of lower melting point fiber such as PE. Other preferred compositions of "pulp" and B/C core sheath PP/PE are 50% "pulp"/50% B/C fibers in tier 7 and 25% "pulp" 75% B/C fibers in tier 9. If latex binder is not applied in section 23, then at least 20% B/C fibers or other types of thermal binder fibers should be used. On the other hand, if latex bind is subsequently applied in sections 23 and 27, then 100% "pulp" fiber can be applied by FP applicators heads 6 and 8. Also, it is possible to apply 100% B/C fibers from FP applicator 6 or applicator 8, or from both applicator heads 6 and 8.

In additional embodiments, instead of 100% B/C fibers, monocomponent regular staple fibers of PP, PET, polyamide and other fibers can be substituted for up to 80% of the B/C or thermal bonding fibers that may be applied by any of the FP application heads 6, 8, 15, 18, and 20. Many types of thermally bondable fusing fibers which completely melt and are also known as "melt fibers" also can be used in place of the B/C fibers, except in dry-laid tier components where 100% B/C fiber would be used.

FIG. 14 further illustrates optional compactor 10 which decreases the thickness of the web and increases fiber-to-fiber adhesion of FP tiers 7 and 9. It should be noted that the extensive pre-bonding typically employed to separately produce the layers is not the objective of this optional compacting step utilized in this inventive in-line process. The compactor 10 may be a calender, which may or may not be heated. The MB or related filter media 12 and 14 may be deposited by one or more MB dies 11 and 13 onto the FP tiers 7 and 9. The primary function of the MB component is to serve as a high efficiency filter, that is, to remove small percentages of small size (less than about 5 micrometers) particles. The specifications of filtration grade MB media and related ultrafine fiber diameter types of filter, media are given in Table I.

The process can include at least one or more MB dies 11 and/or one or more related fine denier, (ultrafine fiber diameter) fiber applicators 13, designated as X. For example, if two identical MB units are utilized, then units 11 and 13 will be the same. Other variations contemplated to come within the breadth of this invention include having the first unit as a SpunBlown (Modular) or Microdenier Spunbond (SB) system first to form a filter gradient of coarser to finer high efficiency filters. Another contemplated variation is for one or more SpunBlown (Modular) or Microdenier SB systems to be used in tandem. Still another variation is to use a Microdenier SB first followed by a SpunBlown system.

The next equipment component shown in FIG. 14 is another FP applicator 15, which deposits an FP web on top of tier 14 (or on tier 12 if a second MB tier 13 is not included). Then the non-prebonded assembly of tiers with tier 16 uppermost travels through another optional compactor 17. Next the intermediate product is conveyed beneath one or more additional FP units 18 and 20. FP applicator heads 15 and 18 incorporate the Dry-Laid Capacity tier into the structure. FP applicator 20 is primarily designed to produce very open (i.e. bulky) FP primarily for dust holding capacity rather than as a filter. The very open FP tier 21 preferably is produced from 100% bicomponent B/C fiber or blends of B/C with ratios of B/C to "pulp" characterized as being higher than is normally used to produce coarse prefilter FP webs. Either or both FP tiers 16 and 19 can also contain split film fibers and "mixed electrostatic fibers". If no B/C fibers or other types of thermal bonding fibers are used in FP tiers 16 and 19, then latex binder should be applied at units 23 and 27 to bond the tiers. If B/C fibers or other types of thermal bonding fibers are incorporated in either of FP applicator heads 15 and 18, then latex binder still can also be applied at units 23 and 27.

The intermediate product with uppermost tier 21 then travels through another compactor 22 and thence through a section of the production line where the previously loose, unbound tiers are subjected to one or more binding process steps that are cumulatively effective to form the unitary stratified structure of the composite filter. Preferably, all of the filter components that will be incorporated into the unitary stratified structure are incorporated in the intermediate product at this stage prior to binding the tiers together.

With further reference to FIG. 14, it is seen that the binding steps take place beginning in, the illustrated embodiment with a latex binder 24 being applied by applicator 23. The latex can be sprayed from a liquid dispersion or emulsion, applied by kiss roll or gravure application, or sprayed as a dry powder onto the substrate and then thermally fused or bonded thereto. The latex also serves as a sealant in that it minimizes dust that can emanate from outside surfaces of the FP tier. After adding latex binder at 23, the intermediate product travels through a heating unit 25 which dries and cures the latex binder to bond the composite. The heating unit can be a heated calender, or an infrared, microwave, or convection oven. A combination of these can also be used. A through-air oven is preferred. If B/C fibers or other types of thermally bondable fusing fibers are present in the intermediate product, then ovens 25 and 29 can serve to thermally fuse such fibers to continue the bonding and formation of the unitary structure.

From the oven 25, the intermediate product is cooled by system 26, and then a second latex binder is applied at 27. As illustrated, the path of travel and spraying unit 27 are positioned to apply latex binder to the side opposite the first application. The intermediate product containing the second latex binder 28 then passes through a second through-air oven 29 and through another cooling section 30. Next, the fully bonded composite film having a unitary stratified structure is charge in cold electrostatic charging station 31, preferably, a Tantret J system. Finally, the composite film 32 is slit to desired width or multiple of widths on shiter 33 and rolled up by the winder 34. Although electrostatic charging is illustrated to take place toward the end of the process, it is contemplated that charging at a stage prior t6 application of latex binder can be performed, provided that the binder and the subsequent procedural steps do not significantly drain the charge from the intermediate product.

The invention claimed is:

1. A composite filter for filtering a stream of ambient air comprising at least one non-prebonded upstream tier and one non-prebonded downstream tier, wherein the ratio of absolute pore volume of upstream tier to downstream tier RAPV>2, and the absolute projected fiber coverage of upstream tier and of downstream tier APFC>95%.

2. The composite filter of claim 1, wherein the ratio of average pore diameter of upstream to downstream tier RPD is 4<RPD<10.

3. The composite filter of claim 2, wherein the average pore diameter of the upstream tier PDU>60 μm.

4. The composite filter of claim 1, wherein the upstream tier comprises a relative pore volume RPVU>94%, an apparent density ADU<0.05 g/cm³, and a thickness D in the range of 0.5 mm<D<2.5 mm.

5. The composite filter of claim 4, wherein the downstream tier comprises a relative pore volume RPVD being smaller than RPVU, an apparent density ADD in the range of 0.07 g/cm³<ADD<0.14 g/cm³, and a thickness D in the range of 0.1 mm<D<0.4 mm.

6. The composite filter of claim 1, wherein the upstream tier comprises fibers having a length in the range of 0.1 mm to 3.0 mm.

7. The composite filter of claim 6, wherein the orientation of the fibers in flow direction in the upstream tier is higher than in the downstream tier.

8. The composite filter of claim 1, wherein the upstream tier comprises a dust retention DR with respect to dust particles with a diameter corresponding to the average pore diameter of the downstream tier of DR>99%.

9. The composite filter of claim 1, wherein the upstream tier comprises dry-laid, thermally bondable fusing, bicomponent or monocomponent polymer fibers and the downstream tier comprises meltblown fibers.

10. The composite filter of claim 9, wherein the upstream tier has a composition selected from the group consisting of 100 wt % bicomponent polymer fibers, a blend of at least about 10 wt % bicomponent polymer fibers with a complementary amount of natural fibers, staple fibers or a mixture thereof, and a blend of at least about 10 wt % monocomponent polymer thermally bondable fusing fibers with a complementary amount of fluff pulp fibers, staple fibers or a mixture thereof.

11. The composite filter of claim 10, wherein the bicomponent polymer fibers have a sheath of one polymer and a core of a different polymer having a melting point higher than the one polymer.

12. The composite filter of claim 11, wherein the core is polypropylene and the sheath is polyethylene.

13. The composite filter of claim 12, wherein the core is disposed eccentric relative to the sheath.

14. The composite filter of claim 9, wherein the upstream tier further comprises fibers selected from at least one of uncharged split film fibers, charged split film fibers and mixed electrostatic fibers.

15. A vacuum cleaner bag comprising a composite filter in accordance with claim 1.

16. A method of making a composite filter in accordance with claim 1, comprising the steps of
    (a) laying down a filtration material onto a support to form the upstream non-prebonded tier,
    (b) depositing onto the upstream tier the downstream non-prebonded tier, and
    (c) bonding the tiers to form a composite filter having a unitary stratified structure.

17. A composite filter produced by the method of claim 16.

18. A vacuum cleaner bag comprising a composite filter produced by the method of claim 16.

19. The composite filter of claim 2, wherein the average pore diameter of the upstream tier PDU is >80 μm and >200 μm.

20. The composite filter of claim 1, wherein the upstream tier comprises a relative pore volume RPVU>96%.

* * * * *

Disclaimer 7,094,270 B2 - Jan Schultink, Overpelt, (BE); and Bas Schultink, Overpelt (BE). COMPOSITE FILTER AND METHOD OF MAKING THE SAME. Patent dated August 22, 2006. Disclaimer filed October 29, 2007, by the inventor.

Hereby enters this disclaimer to claims 1-20, of said patent.

*(Official Gazette, April 28, 2009)*